United States Patent [19]
Peachey

[11] Patent Number: 5,830,368
[45] Date of Patent: Nov. 3, 1998

[54] METHOD FOR BOREHOLE SEPARATION OF OIL AND WATER IN AN OIL WELL

[75] Inventor: Bruce R. Peachey, Edmonton, Canada

[73] Assignee: Centre For Engineering Research Inc., Edmonton, Canada

[21] Appl. No.: 707,241

[22] Filed: Sep. 3, 1996

Related U.S. Application Data

[60] Continuation of Ser. No. 478,440, Jun. 7, 1995, abandoned, which is a division of Ser. No. 226,987, Apr. 13, 1994, Pat. No. 5,456,837.

[51] Int. Cl.$^6$ .................................................. B01D 17/038
[52] U.S. Cl. ...................... 210/747; 166/265; 210/512.2; 210/788; 210/808
[58] Field of Search ............................ 210/97, 136, 137, 210/170, 512.1, 512.2, 747, 787, 788, 808; 166/244.1, 265, 369

[56] References Cited

U.S. PATENT DOCUMENTS

| | | |
|---|---|---|
| 2,311,963 | 2/1943 | Pyle . |
| 2,398,338 | 4/1946 | Walker .................................... 210/136 |
| 2,726,606 | 12/1955 | Davidson . |
| 2,872,985 | 2/1959 | Bertuzzi et al. . |
| 2,910,002 | 10/1959 | Morgan . |
| 3,167,019 | 1/1965 | Harris . |
| 3,195,468 | 7/1965 | Bood . |
| 3,747,306 | 7/1973 | Wikdahl . |
| 4,241,787 | 12/1980 | Price . |
| 4,296,810 | 10/1981 | Price . |
| 4,544,486 | 10/1985 | Carroll ................................. 210/512.1 |
| 4,617,031 | 10/1986 | Suh et al. . |
| 4,659,461 | 4/1987 | Carroll ................................. 210/512.2 |
| 4,721,565 | 1/1988 | Carroll .................................... 210/251 |

(List continued on next page.)

FOREIGN PATENT DOCUMENTS

| | | |
|---|---|---|
| 0022357 | 1/1981 | European Pat. Off. . |
| 2194572 | 3/1988 | United Kingdom . |
| 2194575 | 3/1988 | United Kingdom . |
| 2203062 | 10/1988 | United Kingdom . |
| 2248462 | 4/1992 | United Kingdom . |
| WO86/03143 | 6/1986 | WIPO . |
| WO94/25729 | 4/1993 | WIPO . |
| WO93/09875 | 5/1993 | WIPO . |
| WO94/13930 | 6/1994 | WIPO . |
| WO95/09970 | 4/1995 | WIPO . |

OTHER PUBLICATIONS

Baker, A.C. and Entress, J.H., "The VASPS Subsea Separation and Pumping System," Transations of the Institution of Chemical Engineers, vol. 70, Part A, Jan. 1992.

Baker, A.C. and Lucas–Clements, D.C., "Application of Subsea Separation and Pumping to Marginal and Deepwater Field Developments," 65th Annual Technical Conference of Soc. of Petroleum Engr. New Orleans, LA, Sep. 1990.

Choi, M.S., "Hydrocyclone Produced Water Treatment for Offshore Developments." 65th Annual Technical Conf. of Soc. of Petroleum Engr., New Orleans, LA, Sep. 1990.

Fitzgerald, A., "New Twists Developed for Produced Water Systems," *Offshore Magazine*, Jan. 1992, pp. 43–44.

(List continued on next page.)

*Primary Examiner*—Joseph W. Drodge
*Attorney, Agent, or Firm*—Haynes and Boone, L.L.P.; Rita Irani

[57] ABSTRACT

A method for downhole separation of oil and water within a production fluid downhole in an oil well, includes providing a cyclone separator connected to the outlet of a downhole pump or two or more cyclone separators mounted within a housing and connected to the outlet of a downhole pump. One outlet of the separator or housing is connected to a conduit for transporting the lower density stream to the surface and the second outlet of the separator or housing is connected to a conduit for transporting the higher density stream to an underground formation. The pre-separator downhole pump is preferably selected to maintain dissolved gases in solution while production fluids are within the pump and separators and prevent gas breakout from occurring.

11 Claims, 4 Drawing Sheets

U.S. PATENT DOCUMENTS

| | | |
|---|---|---|
| 4,738,779 | 4/1988 | Carroll et al. ............... 210/512.1 |
| 4,764,287 | 8/1988 | Colman et al. ............... 210/788 |
| 4,766,957 | 8/1988 | McIntyre . |
| 4,770,243 | 9/1988 | Fouillout et al. . |
| 4,805,697 | 2/1989 | Fouillout . |
| 4,822,551 | 4/1989 | Prendergast ............... 264/275 |
| 4,836,935 | 6/1989 | Lilienthal ............... 210/788 |
| 4,844,817 | 7/1989 | Flanigan et al. ............... 210/788 |
| 4,889,475 | 12/1989 | Gannaway et al. . |
| 4,900,445 | 1/1990 | Flanigan et al. ............... 210/512.1 |
| 4,911,850 | 3/1990 | Kalnins ............... 210/788 |
| 4,927,536 | 5/1990 | Worrell et al. ............... 210/512.2 |
| 4,933,094 | 6/1990 | Kalnins ............... 210/788 |
| 4,964,994 | 10/1990 | Wakley ............... 210/512.1 |
| 4,976,872 | 12/1990 | Grey ............... 210/739 |
| 4,980,064 | 12/1990 | Carroll ............... 210/512.1 |
| 4,981,175 | 1/1991 | Powers ............... 166/265 |
| 4,983,283 | 1/1991 | Grey ............... 210/104 |
| 5,009,784 | 4/1991 | Clarke et al. ............... 210/512.1 |
| 5,009,785 | 4/1991 | Webb ............... 210/512.2 |
| 5,017,288 | 5/1991 | Thew et al. ............... 210/512.1 |
| 5,021,165 | 6/1991 | Kalnins ............... 210/703 |
| 5,032,275 | 7/1991 | Thew ............... 210/512.1 |
| 5,045,218 | 9/1991 | Prendergast et al. ............... 210/787 |
| 5,049,277 | 9/1991 | Kalnins ............... 210/512.1 |
| 5,071,556 | 12/1991 | Kalnins et al. ............... 210/512.2 |
| 5,071,557 | 12/1991 | Schubert et al. ............... 210/512.2 |
| 5,093,006 | 3/1992 | Kalnins ............... 210/704 |
| 5,117,908 | 6/1992 | Hofmann . |
| 5,154,826 | 10/1992 | Prendergast et al. ............... 210/512.2 |
| 5,172,717 | 12/1992 | Boyle et al. ............... 137/155 |
| 5,173,022 | 12/1992 | Sango ............... 415/169.1 |
| 5,176,164 | 1/1993 | Boyle ............... 137/155 |
| 5,181,837 | 1/1993 | Niemiec . |
| 5,296,153 | 3/1994 | Peachey ............... 210/787 |
| 5,335,732 | 8/1994 | McIntyre . |

OTHER PUBLICATIONS

Flanigan, D.A., Stolhand, J.E., and Shimoda, E., "Use of Low–Shear Pumps and Hydrocyclones for Improved Performance in the Cleanup of Low–Pressure Water," SPE Production Engineering, Aug. 1992.

Jones, P.S., "A Field Comparison of Static and Dynamic Hydrocyclone," 65th Annual Technical Conf. of Soc. of Petroleum Engrs., New Orleans, LA, Sep. 1990.

Modular Production Equipment Inc., Modular Protection for the Environment. Product Brochure, May 1991.

Wojtanowicz, A.K., Xu, H., "A New Method to Minimize Oilwell Production Watercut Using a Downhole Water Loop," Annual Technical Conf. of Petroleum Society of CIM, Calgary, Jun. 1992.

Young, G.A., Wakley, W.D., Taggert, D.L., Andrews, S.L., and Worrell, J.R., "Oil–Water Separation Using Hydrocyclones —An Experimental Search for Optimum Dimensions," Republication of American Filtration Society Paper given at Baton Rouge Conf., Oct. 29, 1990.

Peachey, B.R., Matthew, C.M., "Downhole Oil/Water Separator Development," Paper No. CIM 93–11, Petroleum Society of CIM, Nov. 1993.

Peachey, Matthews "Downhole Oil Water Separator Development" JCPT vol. 33 #7 pp. 17–21 Sep. 1994.

METHOD FOR BOREHOLE SEPARATION OF OIL AND WATER IN AN OIL WELL

This application is a continuation of application Ser. No. 08/478,440, filed Jun. 7, 1995, now abandoned, which is a division of application Ser. No. 08/226,987, now U.S. Pat. No. 5,456,837.

BACKGROUND OF THE INVENTION

U.S. Pat. No. 5,296,153 teaches a method of reducing the amount of formation water in oil recovered from an oil well through the insertion of a cyclone separator downhole in an oil well producing a stream of mixed oil and water. In accordance with the described method, a first outlet of the cyclone separator is connected to a recovery conduit extending to surface. The recovery conduit conveys a recovery stream of oil with a reduced water content to surface. A second outlet of the cyclone separator is connected to a disposal conduit. The disposal conduit conveys a disposal stream of mainly water to a disposal site, which is usually a downhole formation chosen to be a disposal zone. The reference goes on to describe various pumping configurations which, when used in combination with the cyclone separator, can further enhance recovery.

When the production stream from the oil well has a high gas content, great care must be taken in the selection of the pumping configuration. During downhole processing through the cyclone separator and the pump, "gas breakout" inevitably occurs. Gas breakout involves the release of entrained gases from the liquid being pumped. This gas breakout can adversely affect the efficiency of the pumping configuration and may also impact the operation and efficiency of the cyclone separator.

SUMMARY OF THE INVENTION

What is required is a method of downhole cyclone separation that minimizes the adverse effects of gas breakout.

According to the present invention there is provided a method of downhole cyclone oil/water separation which includes the following steps. Firstly, place a cyclone separator downhole in an oil well producing a mixed stream of oil, water and gas. The cyclone separator includes a separation chamber wherein liquids of differing densities are separated, at least one mixed liquids inlet through which liquids pass into the separation chamber, a first outlet for liquids of a first density range to pass from the separation chamber and a second outlet for liquids of a second density range to pass from the separation chamber. Secondly, connect the first outlet to a recovery conduit extending to surface. Thirdly, connect the second outlet to a disposal conduit extending to a selected disposal site. Fourthly, connect the at least one mixed liquids inlet to pumping means and pump a mixed stream of oil, water and gas into the separation chamber of the cyclone separator. The mixed stream is separated in the separation chamber into a recovery stream of oil with a reduced water content which flows out of the first outlet and along the recovery conduit to the surface and a disposal stream of mainly water which flows out of the second outlet and along the disposal conduit to the selected disposal site.

Gas breakout adversely affecting pumping operation occurs due to pressure drop and agitation as the mixed stream passes through the separation chamber of the cyclone separator. Placing pumping means upstream of the cyclone separator, as described above, is a more effective pumping configuration. The pump, being upstream, is isolated from whatever gas breakout may occur as the mixed stream passes through the separation chamber and is separated into the recovery stream and the disposal stream. Pumping fluids through the separator reduces gas breakout, as it increases the pressure of fluids within the separator and forces the gas to remain in solution.

Although beneficial results may be obtained through the method, as described above, when the disposal site is a selected underground formation it is important that enough pressure be maintained in the pumping configuration to get the disposal stream into the disposal formation. It is also important to be able to accurately determine the amount of fluid that is being disposed of into the disposal formation. Even more beneficial results may, therefore, be obtained when backpressure control means are positioned on one of the second outlet and the disposal conduit. As the backpressure control means has a known backpressure or flow limit, the injection flow rate may be determined from information on pump characteristics. The backpressure control means can take various forms, such as a backpressure valve or a flow restriction orifice. The backpressure control means may also incorporate a check valve or other means to prevent flow from reversing from the disposal zone when the pump stops.

Although beneficial results may be obtained through the use of the method, as described above, with deep wells a high pressure pump is required to both pump water through the cyclone separator to a disposal zone and to pump the recovery stream to surface. Even more beneficial results may, therefore, be obtained when secondary pump means communicates with the recovery conduit to assist in pumping the recovery stream to the surface. When two pumps are used the total power requirements for producing a given amount of fluid from a well are reduced. The first pump provides the energy to pass the liquids through the cyclone separator and into the injection zone, while the secondary pump provides any additional energy that may be required to lift the recovery stream to surface.

It will be appreciated by one skilled in the art that the working environment in which the described method is to be employed can involve well casings as small as four or five inches in diameter. This limits the diameter of cyclone separator which can be used, and thus the capacity of the cyclone separator. The key to improving the economics of recovery using the described method is to increase flow rates that can be separated in the given diameter, reduce power requirements, or both. For this reason an apparatus has been developed for use with the described method that improves the economics of recovery. According to this aspect of the invention there is provided an apparatus for downhole cyclone separation which includes a multiple cyclone separator housing having an interior cavity, at least one inlet, at least one disposal stream outlet and at least one recovery stream outlet. A plurality of cyclone separators are disposed in the interior cavity of the cyclone separator housing. Each of the cyclone separators has a separation chamber wherein liquids of differing densities are separated;

at least one mixed liquids inlet through which liquids pass into the separation chamber; a first outlet for liquids of a first density range to pass from the separation chamber; and a second outlet for liquids of a second density range to pass from the separation chamber. Means are provided for channelling a mixed liquids flow stream flowing through the at least one mixed liquids inlet of the multiple cyclone separator housing to the at least one mixed liquids inlet of each of the cyclone separators. Means are provided for channelling a recovery flow stream from the first outlet of each of the cyclone separators to the at least one recovery stream outlet of the multiple cyclone separator housing. Means for channelling a disposal flow stream from the second outlet of each of the cyclone separators to the at least one disposal stream outlet of the multiple cyclone separator housing. Mixed liquids passing through the at least one mixed liquid inlet of the multiple cyclone separator housing are channelled by the channelling means to the at least one mixed liquid inlet of each of the cyclone separators. The liquids are separated in the separation chamber of the cyclone separators with a recovery stream passing through the first outlet of each of the cyclone separators to the outlet conduit for channelling by the channelling means through the at least one recovery stream outlet in the multiple cyclone separator housing. A disposal stream is discharged from the second outlet of each of the cyclone separators for channelling by the channelling means through the at least one disposal stream outlet in the multiple cyclone separator housing.

With the apparatus, as described above, multiple cyclone separators work simultaneously in the multiple cyclone separator housing. The preferred channelling means is by way of conduit. Only two conduit are required as the interior cavity of the housing can serve as one of the channelling means. In accordance with the described method a mixed stream of oil, water and gas is pumped into the at least one mixed liquids inlet of the multiple cyclone separator housing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

A method of downhole cyclone oil/water separation will now be described with reference to FIGS. 1 through 5.

Figure 1:
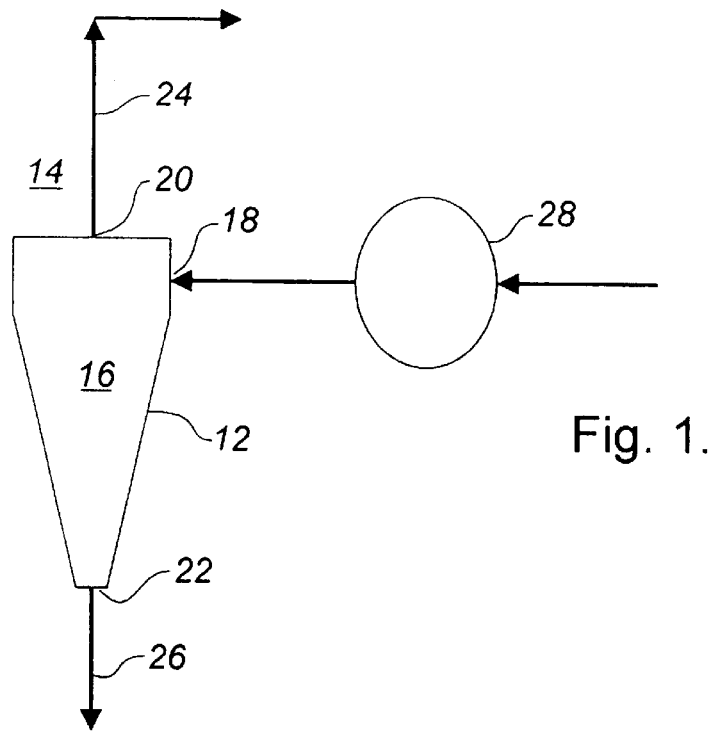
FIG. 1 is a schematic diagram of a first form of pumping configuration in accordance with the described method.

Referring to FIG. 1, the preferred method includes the following steps. Firstly, place a cyclone separator 12 downhole in an oil well 14 producing a mixed stream of oil, water and gas. Cyclone separator 12 includes a separation chamber 16 wherein liquids of differing densities are separated, a mixed liquids inlet 18 through which liquids pass into separation chamber 16, a first outlet 20 for liquids of a first density range to pass from separation chamber 16 and a second outlet 22 for liquids of a second density range to pass from separation chamber 16. Secondly, connect first outlet 20 to a recovery conduit 24 extending to surface (not shown). Thirdly, connect second outlet 22 to a disposal conduit 26 extending to a selected disposal site (not shown). Fourthly, connect mixed liquids inlet 18 to a pump 28 and pump a mixed stream of oil, water and gas into separation chamber 16 of cyclone separator 12. The mixed stream is separated in separation chamber 16 into a recovery stream of oil with a reduced water content which flows out of first outlet 20 and along recovery conduit 24 to the surface and a disposal stream of mainly water which flows out of second outlet 22 and along disposal conduit 26 to the selected disposal site.

Figure 2:
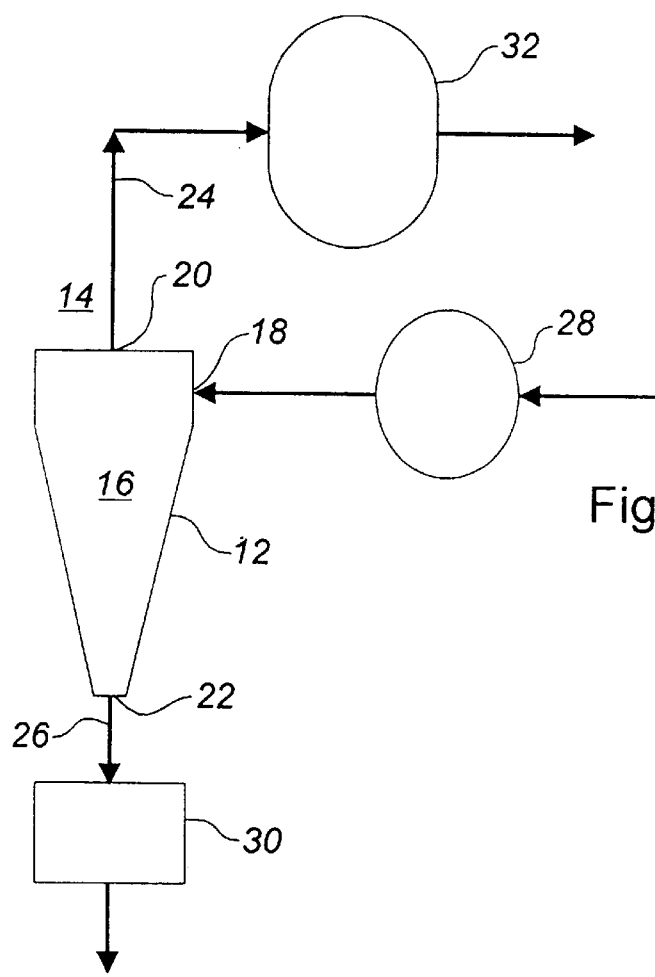
FIG. 2 is a schematic diagram of an enhanced form of pumping configuration in accordance with the described method.

Referring to FIG. 2, an enhanced pumping configuration is disclosed in which a backpressure valve 30 is positioned on disposal conduit 26. The use of backpressure valve 30 ensures that there is sufficient pressure maintained to get the disposal stream into an underground disposal formation selected as a disposal site, while at the same time ensuring that the pump and cyclone separator are both operating within their most efficient operating ranges. It also enables a more accurate assessment to be made as to the amount of fluid being pumped into the disposal site. There are other backpressure control means that can be used such as a flow restriction orifice. Backpressure valve 30 is preferred as it prevents a reversal of flow when pump 28 is turned off. In field installations which include pumps adversely affected by a reverse flow when stopped, the flow reversing the pump motor turns backward preventing the pump from being restarted. Referring to FIG. 2, there is also provided a secondary pump 32 is positioned on the recovery conduit 24. Secondary pump 32 is intended to assist in conveying the recovery stream to the surface. The problem of gas breakout, previously described, does not adversely affect the operation of secondary pump 32 due to the fact that pump 28 provides sufficient pressure to maintain the majority of the gas in solution.

Figure 3:
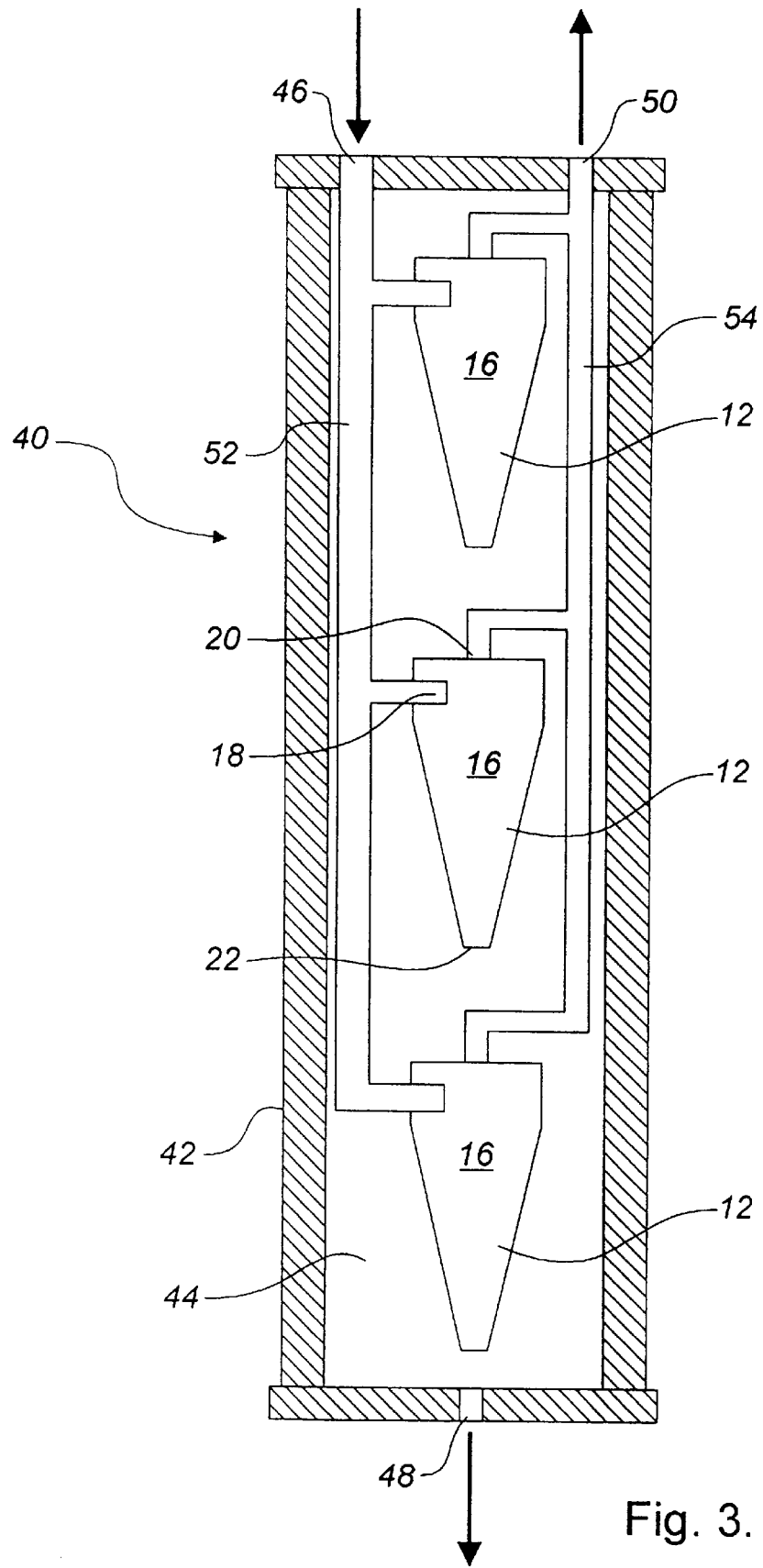
FIG. 3 is a side elevation view in longitudinal section of an apparatus developed for use with the described method.

An apparatus for downhole cyclone separation, generally identified by reference numeral 40, been especially developed for use with the described method. When apparatus 40 is used with the described method separation capacity and production flow rates can be greatly increased. This apparatus will now be described with reference to FIG. 3. Apparatus 40 includes a multiple cyclone separator housing 42 having an interior cavity 44, an mixed liquids inlet 46, a disposal stream outlet 48 and a recovery stream outlet 50. Although single inlets and outlets are illustrated, it will be appreciated that multiple inlets or outlets into housing 42 could be utilized depending upon the installation environment. A plurality of cyclone separators 12 are disposed in interior cavity 44 of multiple cyclone separator housing 42. As previously described, each of cyclone separators 12 has a separation chamber 16 wherein liquids of differing densities are separated, a mixed liquids inlet 18 through which liquids pass into separation chamber 16, a first outlet 20 for liquids of a first density range to pass from separation chamber 16, and a second outlet 22 for liquids of a second density range to pass from separation chamber 16. Some means must be used for channelling the various flow streams flowing into mixed liquids inlet 18 and out of first outlet 20 and second outlet 22. The channelling means illustrated in FIG. 3 is by way of conduits 52 and 54. It should be noted that only two conduit are required as in the illustrated embodiment interior cavity 44 of multiple cyclone separator housing 42 can serve as one of the channelling means. Conduit 52 has been connected as an inlet conduit allowing liquids to pass from mixed liquids inlet 46 in multiple cyclone separator housing 42 to mixed liquids inlets 18 of each of cyclone separators 12. Conduit 54 has been connected as an outlet conduit allowing liquids to pass from first outlet 20 of each of cyclone separators 12 to recovery stream outlet 50 of multiple cyclone separator housing 42. Second outlet 22 of each of cyclone separators 12 discharges directly into interior cavity 44, so that interior cavity 44 serves to connect second outlet 22 of each of cyclone separators 12 with disposal stream outlet 48.

Figure 4:
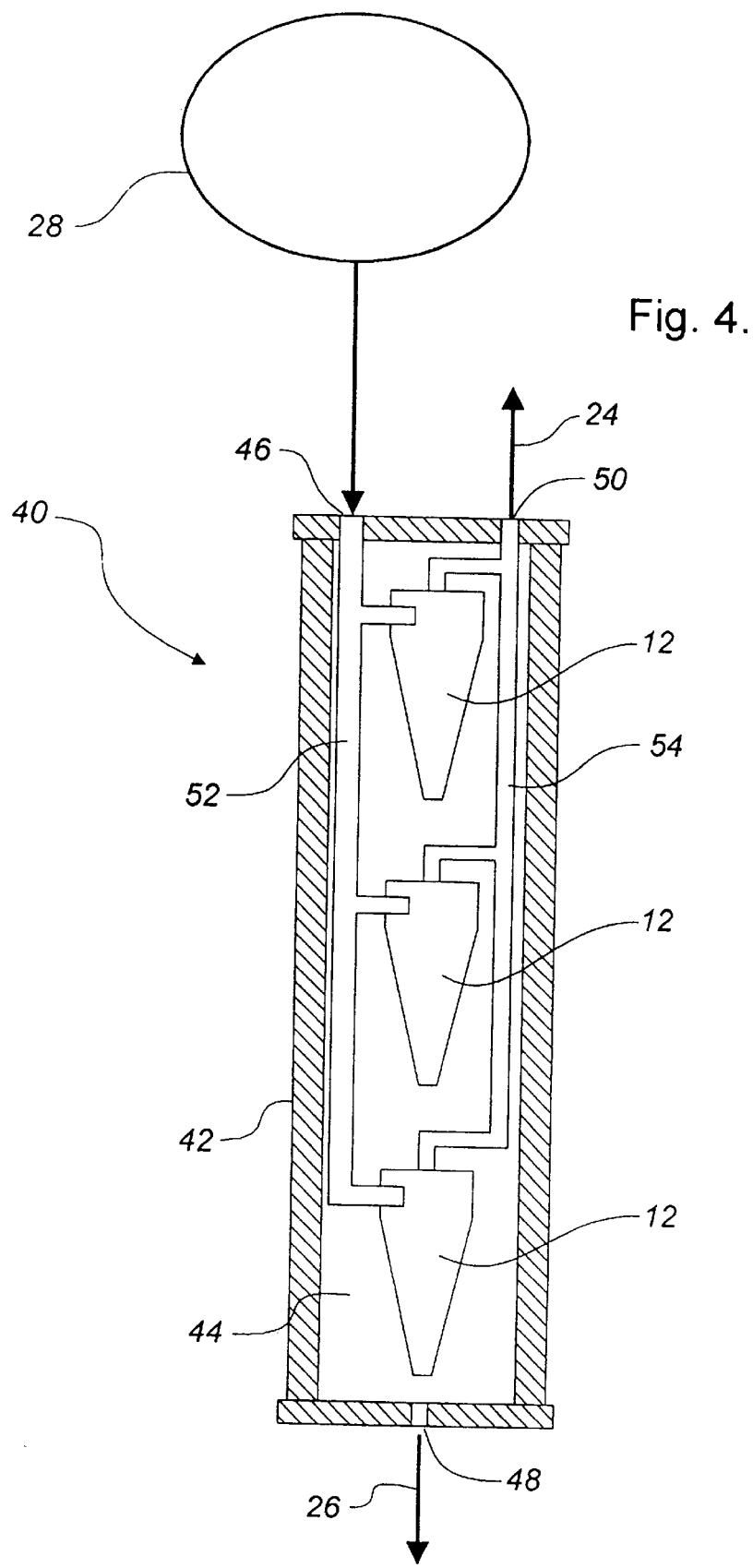
FIG. 4 is a schematic diagram of a pumping configuration involving the apparatus illustrated in FIG. 3.

When apparatus 40 is used with the described method the following steps are taken, as illustrated in FIG. 4. Firstly, multiple cyclone separator housing 42 is placed downhole in an oil well producing a mixed stream of oil, water and gas. Secondly, recovery stream outlet 50 of multiple cyclone separator housing 42 is connected to recovery conduit 24 extending to surface. Thirdly, disposal stream outlet 48 of multiple cyclone separator housing 42 is connected to disposal conduit 26 extending to a selected disposal site. Fourthly, a mixed stream of oil, water and gas is pumped by means of pump 28 into mixed liquids inlet 46 of multiple cyclone separator housing 42. The mixed stream of oil, water and gas is channelled by inlet conduit 50 to mixed liquid inlets 18 of each of cyclone separators 12, whereupon the oil and water is separated in separation chamber 16 of cyclone separators 12. A recovery stream of oil with a reduced water content passes through first outlet 20 of each of cyclone separators 12 for channelling by outlet conduit 54 to recovery stream outlet 50 in multiple cyclone separator housing 42 for conveyance through recovery conduit 24 to the surface. A disposal stream of water is discharged from second outlet 22 of each of cyclone separators 12 into interior cavity 44 for channelling to disposal stream outlet 48 of multiple cyclone separator housing 42 for disposal through disposal conduit 26 to the selected disposal site.

The use of apparatus 40 provides numerous advantages. The flow rate is increased. The pressure drop across each of separators 12 is reduced, which reduces the power requirements and reduces the chance of gas breakout downstream. Multiple cyclone separators 12 provide a redundancy, if any one cyclone separator ceases to function, the remaining cyclone separators can continue to function.

Figure 5:
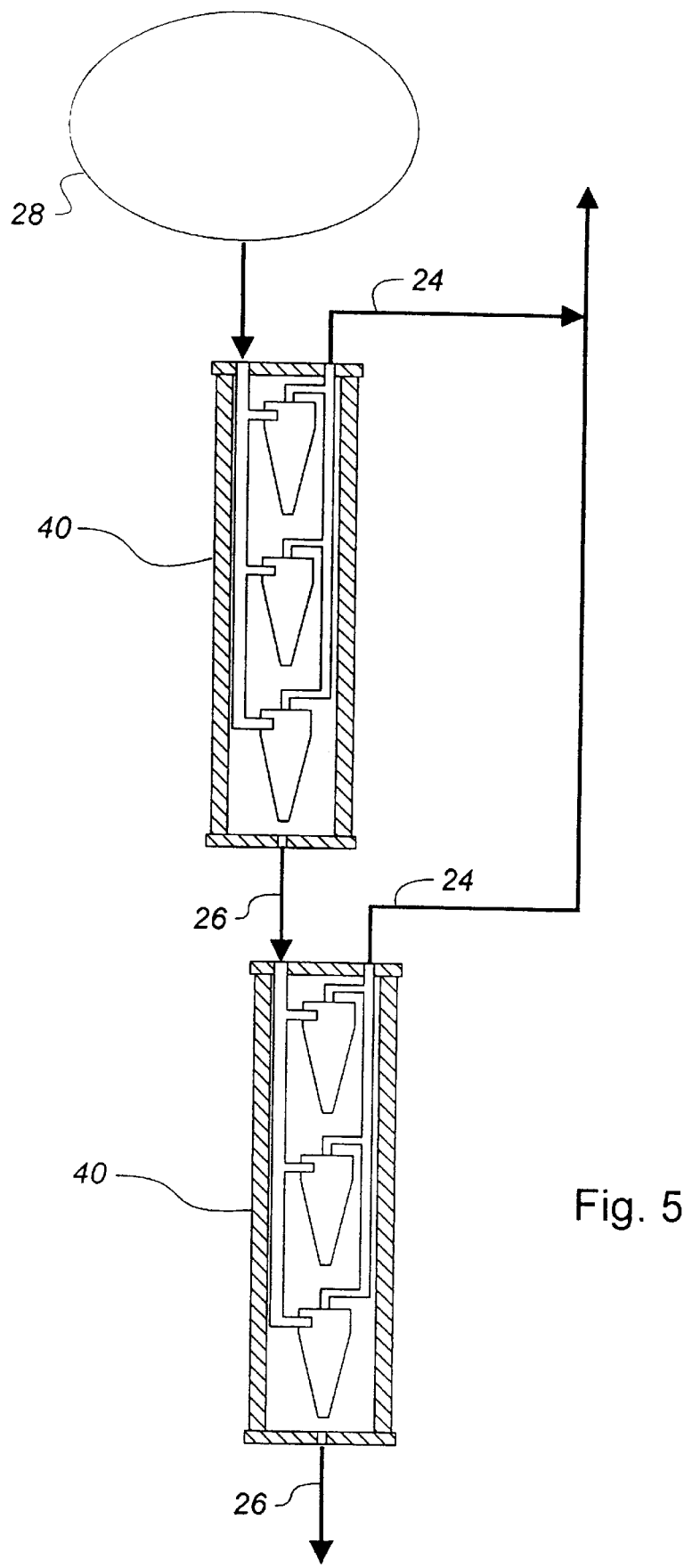
FIG. 5 is a side elevation view in longitudinal section of a plurality of the apparatus illustrated in FIG. 3 connected in series.

A cyclone separator has a separation ratio that the percentage of the fluids flowing through first outlet 20 bears to the entire volume of fluids flowing through separation chamber 16. There is no minimum percentage. This means that in wells with an extremely high water content, the majority of the fluids (ie. the water) can be left downhole. There is however a maximum percentage of approximately 25 percent of the total volume leaving via first outlet 20. At this maximum percentage approximately 75 percent of the fluids are leaving via second outlet 22. This creates a problem with oil wells having a low water content. There is a danger that a portion of the oil can be pumped into the disposal zone along with the water. Referring to FIG. 5, in oil wells with a low water content, a plurality of apparatus 40 containing multiple cyclone separators can be connected in series. In this way a sequential reduction in the oil content can occur prior to pumping the disposal stream to the selected disposal site.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. A method for reducing the amount of water in an oil-and-water stream to be produced from an oil well wherein the stream includes dissolved gas, comprising the steps of:

(a) providing a cyclone separator device sized to fit within the well bore for separating the oil-and-water stream into a higher density stream and a lower density stream, the separator device having an inlet, a first outlet for the lower density stream and a second outlet for the higher density stream;

(b) providing a first pump for pumping fluids into the inlet of the separator device;

(c) connecting the first outlet of the separator device to a lower density fluid conduit for producing the lower density stream;

(d) connecting the second separator device outlet to a higher density fluid conduit for conducting the higher density stream to an underground formation;

(e) placing the separator device, the first pump and the lower density fluid conduit and the higher density fluid conduit in the well; and (f) activating the pump so as to move the fluids through the separator device and into the lower density and higher density fluid conduits without allowing gas breakout to occur.

2. The method of claim 1 wherein the first pump is selected to provide sufficient pressure in the oil-and-water stream passing through the pump to retain the majority of dissolved gas in solution while the stream passes through the pump and the device.

3. The method of claim 1 additionally comprising the step of providing a backpressure control in the higher density fluid conduit.

4. The method of claim 3 wherein the backpressure control is a valve.

5. The method of claim 3 wherein the backpressure control is an orifice.

6. The method of claim 1 additionally comprising the step of providing reverse flow control in the higher density conduit.

7. The method of claim 1 additionally comprising the step of providing a second pump between the first outlet of the separator device and the lower density conduit for assisting in movement of the lower density stream for production of the stream and selecting and operating the first pump to retain the majority of dissolved gas in solution thus without allowing gas breakout to occur while the stream passes through the first pump, the separator device, and into the second pump.

8. The method of claim 1 wherein the cyclone separator device is a single cyclone separator.

9. The method of claim 1 wherein the cyclone separator device is a plurality of cyclone separators mounted within a housing, each cyclone separator having an inlet, a first outlet and a second outlet, and wherein the housing includes an inlet for receiving fluids from the pump, a first housing outlet for conducting fluids to the lower density fluid conduit and a second housing outlet for conducting fluid to the higher density fluid conduit and wherein each cyclone separator inlet is in fluid communication with the housing inlet, each cyclone separator first outlet is in fluid communication with the first housing outlet and each cyclone separator second outlet is in fluid communication with the second housing outlet.

10. The method of claim 9 wherein each cyclone separator inlet is in fluid communication with the housing inlet by way of an inlet conduit mounted within the housing and wherein each cyclone separator second outlet is in fluid communication with the second housing outlet by way of a flow channel defined by an open space within the housing.

11. The method of claim 9 further comprising the steps of providing a plurality of separator devices, each device having inlets and outlets connected in series to provide sequential separation of the higher density stream and the lower density stream before the lower density stream is conducted through the lower density fluid conduit to the surface and before the higher density stream is conducted through the higher density fluid conduit to the underground formation.

* * * * *